US012611917B2

(12) United States Patent
Ying

(10) Patent No.: US 12,611,917 B2
(45) Date of Patent: Apr. 28, 2026

(54) ROLLER SHUTTER COVER

(71) Applicant: Nantong Jiale Auto Parts Technology Co., Ltd., Nantong (CN)

(72) Inventor: Xiaoqian Ying, Lin'an (CN)

(73) Assignee: Nantong Jiale Auto Parts Technology Co., Ltd., Nantong (CN)

( * ) Notice: Subject to any disclaimer, the term of this patent is extended or adjusted under 35 U.S.C. 154(b) by 0 days.

(21) Appl. No.: 19/319,745

(22) Filed: Sep. 5, 2025

(65) Prior Publication Data

US 2026/0061808 A1 Mar. 5, 2026

Related U.S. Application Data

(63) Continuation-in-part of application No. 18/885,667, filed on Sep. 15, 2024, now abandoned.

(30) Foreign Application Priority Data

Aug. 28, 2024 (CN) .......................... 202411194730.X

(51) Int. Cl.
*B60J 7/06* (2006.01)
*B60J 10/25* (2016.01)

(52) U.S. Cl.
CPC .............. *B60J 7/068* (2013.01); *B60J 10/25* (2016.02)

(58) Field of Classification Search
CPC . B60J 10/25; B60J 10/90; B60J 7/0084; B60J 7/0015; B60J 7/067; B60J 7/068; B60J 7/085; B60J 5/14; B60P 7/02; B60P 7/04
See application file for complete search history.

(56) References Cited

U.S. PATENT DOCUMENTS 1,738,060 A * 12/1929 Barnes ..................... B60J 7/067
296/219
2,250,604 A * 7/1941 Poorman ................... B60J 5/14
160/267.1

(Continued)

FOREIGN PATENT DOCUMENTS

DE 102015004859 A1 10/2016
FR 2824867 A1 11/2002
WO 9002056 A1 3/1990

OTHER PUBLICATIONS

European Search Report in application No. EP 22185152.0, mailed on Nov. 24, 2022.

*Primary Examiner* — Johnnie A. Shablack
(74) *Attorney, Agent, or Firm* — PV IP PC; Wei Te Chung

(57) ABSTRACT

A roller shutter cover, including a slide rail, a roller shutter, and a manual driving structure, where the roller shutter is connected to the slide rail and can move on the slide rail, the roller shutter includes a plurality of sequentially connected shutter slats, and the manual driving structure is disposed at one end of the roller shutter and can drive the roller shutter to move on the slide rail so that the roller shutter switches between an opened state and a storage state. As the roller shutter cover is provided with the slide rail, the slide rail can enable the roller shutter to move more smoothly and can also cover an edge of the roller shutter to prevent rainwater and the like from entering a truck bed. Meanwhile, the manual driving structure can drive the roller shutter to move, thereby saving time and labor.

17 Claims, 10 Drawing Sheets

(56)                References Cited

U.S. PATENT DOCUMENTS

| | | | | |
|---|---|---|---|---|
| 3,092,170 | A * | 6/1963 | Ellis | E06B 9/08 |
| | | | | 160/264 |
| 3,467,431 | A * | 9/1969 | Turcotte | B60J 7/085 |
| | | | | 296/98 |
| 4,563,034 | A * | 1/1986 | Lamb | B60J 7/068 |
| | | | | 160/266 |
| 4,611,848 | A * | 9/1986 | Romano | B60J 7/068 |
| | | | | 296/100.09 |
| 4,795,206 | A * | 1/1989 | Adams | B60J 5/14 |
| | | | | 296/100.09 |
| 4,807,921 | A * | 2/1989 | Champie, III | B60J 7/068 |
| | | | | 296/100.09 |
| 4,889,381 | A * | 12/1989 | Tamblyn | B60J 7/068 |
| | | | | 296/100.09 |
| 5,040,843 | A * | 8/1991 | Russell | E06B 9/581 |
| | | | | 296/100.09 |
| 5,054,840 | A * | 10/1991 | Wilhite | B60J 7/085 |
| | | | | 160/265 |
| 5,096,250 | A * | 3/1992 | Menz | B60J 7/068 |
| | | | | 296/105 |
| 5,350,213 | A * | 9/1994 | Bernardo | B60J 7/041 |
| | | | | 296/100.09 |
| 6,030,021 | A * | 2/2000 | Ronai | B60J 7/085 |
| | | | | 296/100.18 |
| 6,126,226 | A * | 10/2000 | Wheatley | B60J 7/104 |
| | | | | 296/100.01 |
| 6,848,734 | B1 * | 2/2005 | Mulvaney | B60J 7/085 |
| | | | | 160/133 |
| 7,156,143 | B2 * | 1/2007 | Katada | B60J 7/0015 |
| | | | | 160/288 |
| 7,363,786 | B2 * | 4/2008 | TerHaar | E05B 13/108 |
| | | | | 292/216 |
| 7,537,264 | B2 * | 5/2009 | Maimin | B60P 7/02 |
| | | | | 296/100.09 |
| 8,714,622 | B2 * | 5/2014 | Spencer | B60P 7/02 |
| | | | | 296/100.18 |
| 9,221,380 | B2 * | 12/2015 | Spencer | B60J 7/10 |
| 9,834,076 | B2 * | 12/2017 | Rohr | B60J 7/067 |
| 10,406,896 | B2 * | 9/2019 | Ford | B60J 7/041 |
| 10,851,544 | B1 * | 12/2020 | Volin | E04F 10/10 |
| 10,875,391 | B2 * | 12/2020 | Facchinello | B60J 7/0084 |
| D907,563 | S * | 1/2021 | Shi | D12/401 |
| 10,988,009 | B1 * | 4/2021 | Weng | B60J 7/141 |
| 11,453,281 | B2 * | 9/2022 | Voetmann | B60J 7/068 |
| 11,465,474 | B2 * | 10/2022 | Schollhammer | B60J 7/068 |
| 11,548,358 | B2 * | 1/2023 | Xia | B60J 7/041 |
| 11,697,332 | B2 * | 7/2023 | Bernardo | B60J 7/085 |
| | | | | 296/100.09 |
| 11,884,145 | B2 * | 1/2024 | Pompili | B60R 5/048 |
| 11,885,177 | B2 * | 1/2024 | Fowler | E06B 9/58 |
| 12,246,584 | B1 * | 3/2025 | Ying | B60J 7/041 |
| 12,296,664 | B2 * | 5/2025 | Becker | B60J 7/141 |
| D1,081,194 | S * | 7/2025 | Ying | D6/575 |
| 12,441,167 | B1 * | 10/2025 | Ying | B60J 7/068 |
| 2003/0230909 | A1 * | 12/2003 | Melius | B60J 7/067 |
| | | | | 296/98 |
| 2022/0001729 | A1 * | 1/2022 | Facchinello | B60J 7/0084 |
| 2022/0134851 | A1 * | 5/2022 | Lin | E05F 15/603 |
| | | | | 160/271 |
| 2022/0363189 | A1 * | 11/2022 | Xia | B60Q 3/53 |
| 2023/0159112 | A1 * | 5/2023 | Spray | B62D 33/04 |
| | | | | 296/100.01 |
| 2023/0264545 | A1 * | 8/2023 | Carter | B60J 7/068 |
| | | | | 296/98 |
| 2023/0264548 | A1 * | 8/2023 | Dylewski | B60J 7/141 |
| | | | | 296/100.12 |
| 2023/0286361 | A1 * | 9/2023 | Mantovani | B60P 7/02 |
| 2023/0398844 | A1 * | 12/2023 | Fu | B60J 7/085 |
| 2024/0294056 | A1 * | 9/2024 | Tam | F16D 11/14 |
| 2025/0206109 | A1 * | 6/2025 | Kikuchi | B60J 7/0015 |

* cited by examiner

10

A-A

10

ROLLER SHUTTER COVER

CROSS-REFERENCE TO RELATED APPLICATIONS

The present application is a Continuation-In-Part application of U.S. patent application Ser. No. 18/885,667 filed on Sep. 15, 2024, which claims the benefit of and priority to Chinese patent application No. 202411194730X filed with China National Intellectual Property Administration on Aug. 28, 2024, the content of the aforementioned applications is incorporated herein by references in their entireties.

TECHNICAL FIELD

The present disclosure relates to the technical field of roller shutters, specifically to a roller shutter cover.

BACKGROUND

The pickup truck is a light truck with an open-top truck bed. In order to improve sealing and convenience, some pickup trucks will be mounted with retractable roller shutter covers on top of truck beds. The roller shutter cover can slide on slide rails to be opened or closed.

The existing roller shutter cover roughly has the following problems: (1) plastic covering cloth is manually rolled, and locking edges are processed on the cloth to form a manual rolling and locking structure together with a frame structure of a truck bed to cover the truck bed, but this type of plastic is prone to damage and aging; (2) folding and coverage are implemented with a hinge structure by using a hard board structure, such that it is prone to water leakage and inconvenient for an adult to operate; (3) a telescopic structure is manually pushed or pulled, such that it is inconvenient to operate and is time-consuming and laborious; and (4) for a conventional electric telescopic structure, a roller shutter is driven by a motor to slide on rails to be opened or closed, but it is easily obstructed by external dirt, and the motor and a controller are prone to malfunction. Furthermore, after the motor and the controller malfunction or after power supply of the complete vehicle is abnormal, the product will not be able to be opened or closed normally, losing its normal function.

SUMMARY

In view of this, it is necessary to provide a roller shutter cover, to solve at least one of the above problems.

The present disclosure provides a roller shutter cover, including:

a slide rail;

a roller shutter, connected to the slide rail and capable of moving on the slide rail, where the roller shutter includes a plurality of sequentially connected shutter slats; and a manual driving structure, disposed at one end of the roller shutter and capable of driving the roller shutter to move on the slide rail so that the roller shutter switches between an opened state and a storage state.

It can be seen from the above technical solution that embodiments of the present disclosure have at least the following advantages and positive effects.

According to the above roller shutter cover, as the roller shutter cover is provided with the slide rail, the slide rail can enable the roller shutter to move more smoothly and can also cover an edge of the roller shutter to prevent rainwater and the like from entering a truck bed. Meanwhile, the manual driving structure can drive the roller shutter to move, thereby saving time and labor.

BRIEF DESCRIPTION OF THE DRAWINGS

In order to more clearly illustrate the technical solutions in the embodiments of the present disclosure or in the prior art, the accompanying drawings that need to be used in the description of the embodiments or the prior art will be briefly introduced below. Apparently, the accompanying drawings in the description below merely illustrate some embodiments of the present disclosure. Those of ordinary skill in the art may also derive other accompanying drawings from these accompanying drawings without creative efforts. In the drawings.

REFERENCE NUMERALS

Figure 1:
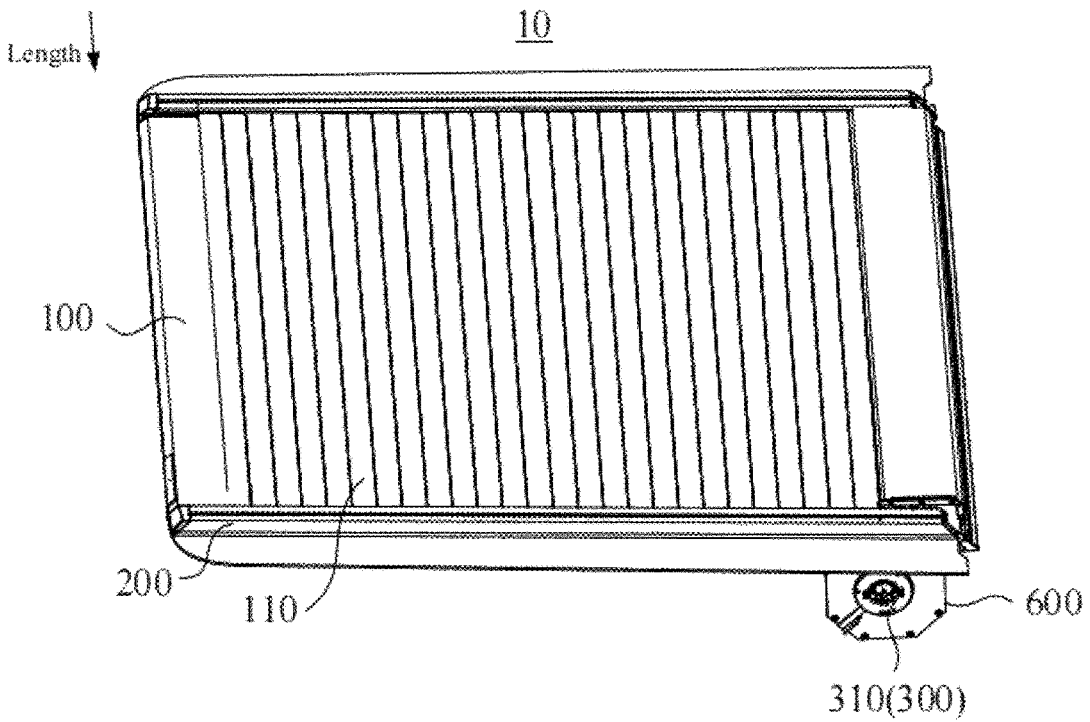
FIG. 1 is a schematic structural diagram of a roller shutter cover in an opened state in an embodiment of the present disclosure.

10: roller shutter cover;

20: manual driving structure; 21: traction member; 22: locking structure; 23: pin;

30: movement auxiliary member; 31: sealing member; 32: reinforcing rib;

40: main slideway; 41: arc surface;

50: protective slideway;

60: light-emitting member; 61: clamping groove structure;

70: protruding portion;

100: roller shutter; 110: shutter slat; 120: transmission shaft;

200: slide rail; 210: water collection tank;

300: driving device; 310: motor; 311: protruding portion; 312: second tooth portion;

400: roller shaft; 410: transmission bracket; 420: shaft coupling; 421: first tooth portion;

500: control assembly; 510: limiting element; 520: control element; 521: rotating ring;

600: box; 601: first plate; 602: second plate; 603: third plate; 610: mounting hole; 620: adapter ring; 630: fixed cover; 631: groove; 650: filter cover;

700: drainage apparatus; 710: drainage hole.

DETAILED DESCRIPTION

Typical embodiments that embody the features and advantages of the present disclosure will be described in detail in the following description. It should be understood that the present disclosure can have various changes in different embodiments without departing from the scope of the present disclosure, and the description and drawings therein are essentially for illustrative purposes and not intended to limit the present disclosure.

In addition, the terms "first" and "second" are only for descriptive purposes, and cannot be construed as indicating or implying relative importance or implying the number of technical features indicated. Thus, the features defined with "first" and "second" may explicitly or implicitly include one or more of the features. In the description of the present disclosure, "a plurality of" means two or more, unless otherwise expressly and specifically defined. In addition, "/" means "or", for example, A/B may represent A or B; and "and/or" herein is merely an association relationship describing associated objects, indicating that three kinds of relationships may exist, for example, A and/or B may indicate three cases in which A exists alone, both A and B exist, and B exists alone.

The terms "dispose", "connected", and "connect" should be understood in a broad sense, unless otherwise expressly specified and limited. For example, it may be a fixed connection, a detachable connection, or an integrated connection; it may be a mechanical connection or an electrical connection; and it may be being directly connected, being indirectly connected via an intermediate medium, or a communication between interiors of two elements.

Different embodiments in this application can be implemented independently or in combination with one another.

The existing roller shutter cover has the following problems: (1) plastic covering cloth is manually rolled, and locking edges are processed on the cloth to form a manual rolling and locking structure together with a frame structure of a truck bed to cover the truck bed, but this type of plastic is prone to damage and aging; (2) folding and coverage are implemented with a hinge structure by using a hard board structure, such that it is prone to water leakage and inconvenient for an adult to operate; and (3) a telescopic structure is manually pushed or pulled, such that it is inconvenient to operate and is time-consuming and laborious.

In order to solve at least one of the above technical problems, the present disclosure proposes a roller shutter cover.

Figure 2:
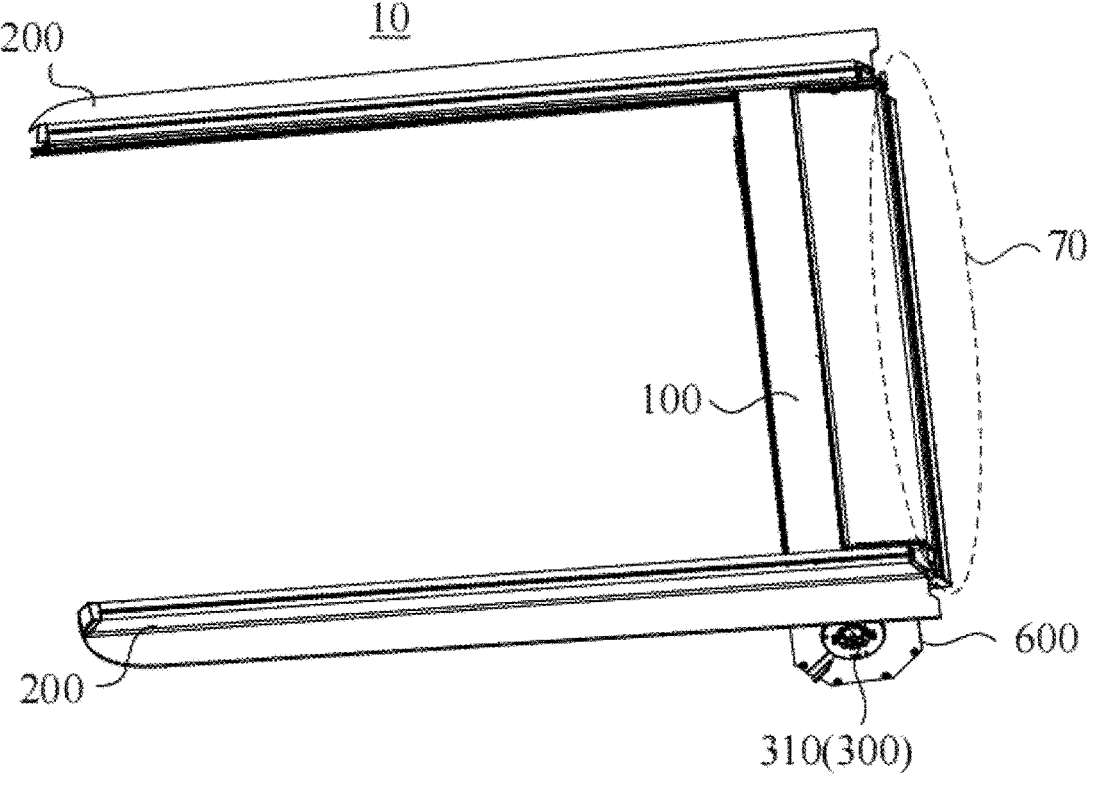
FIG. 2 is a schematic structural diagram of the roller shutter cover in a storage state that is shown in FIG. 1.
Figure 3:
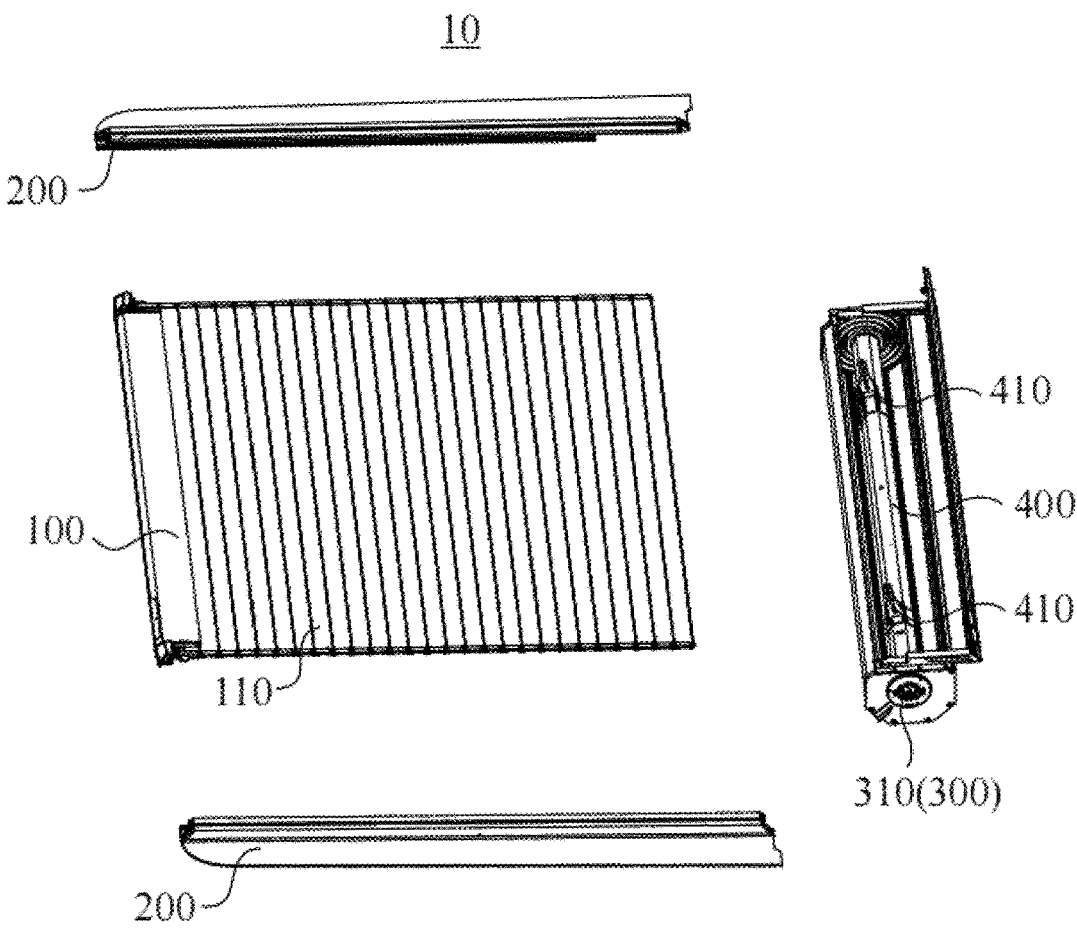
FIG. 3 is an exploded structural view of the roller shutter cover shown in FIG. 1.

Referring to FIG. 1, FIG. 2, and FIG. 3 in combination, a roller shutter cover 10 is configured to cover a truck bed of a pickup truck, and a roller shutter 100 has an opened state shown in FIG. 1 and a storage state shown in FIG. 2. When the roller shutter 100 is in the opened state, the roller shutter cover 10 can protect goods in the truck bed from wind and rain. When the roller shutter 100 is in the storage state, a user can carry the goods in the truck bed. It can be understood that the roller shutter 100 can be configured to cover the truck bed of the pickup truck, and the roller shutter 100 can also be configured to cover carrier vehicles such as cars and heavy-duty trucks.

The roller shutter cover 10 includes a roller shutter 100, a slide rail 200, and a driving device 300, where the roller shutter 100 is connected to the slide rail 200 and can move on the slide rail 200, the roller shutter 100 includes a plurality of sequentially connected shutter slats 110, the driving device 300 is connected to one end of the roller shutter 100, and the driving device 300 can drive the roller shutter 100 to move on the slide rail 200 so that the roller shutter 100 switches between an opened state and a storage state.

It is to be noted that the "length direction" appearing throughout the present disclosure is as shown in FIG. 1, the "length direction" refers to a direction perpendicular to a moving direction of the roller shutter 100, and the "length direction" has nothing to do with a specific numerical value.

In the present disclosure, as the roller shutter cover 10 is provided with the slide rail 200, the slide rail 200 can enable the roller shutter 100 to move more smoothly, and the slide rail 200 can also cover an edge of the roller shutter 100 to prevent rainwater and the like from entering a truck bed. Meanwhile, the driving device 300 can drive the roller shutter 100 to move, thereby saving time and labor.

Figure 4:
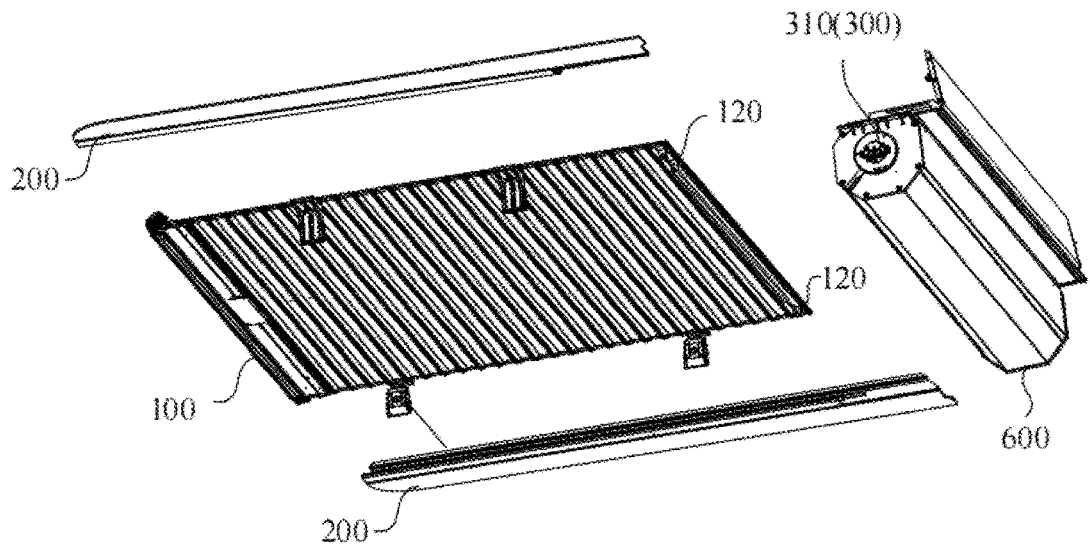
FIG. 4 is an exploded structural view of the roller shutter cover shown in FIG. 3 from another perspective.
Figure 5:
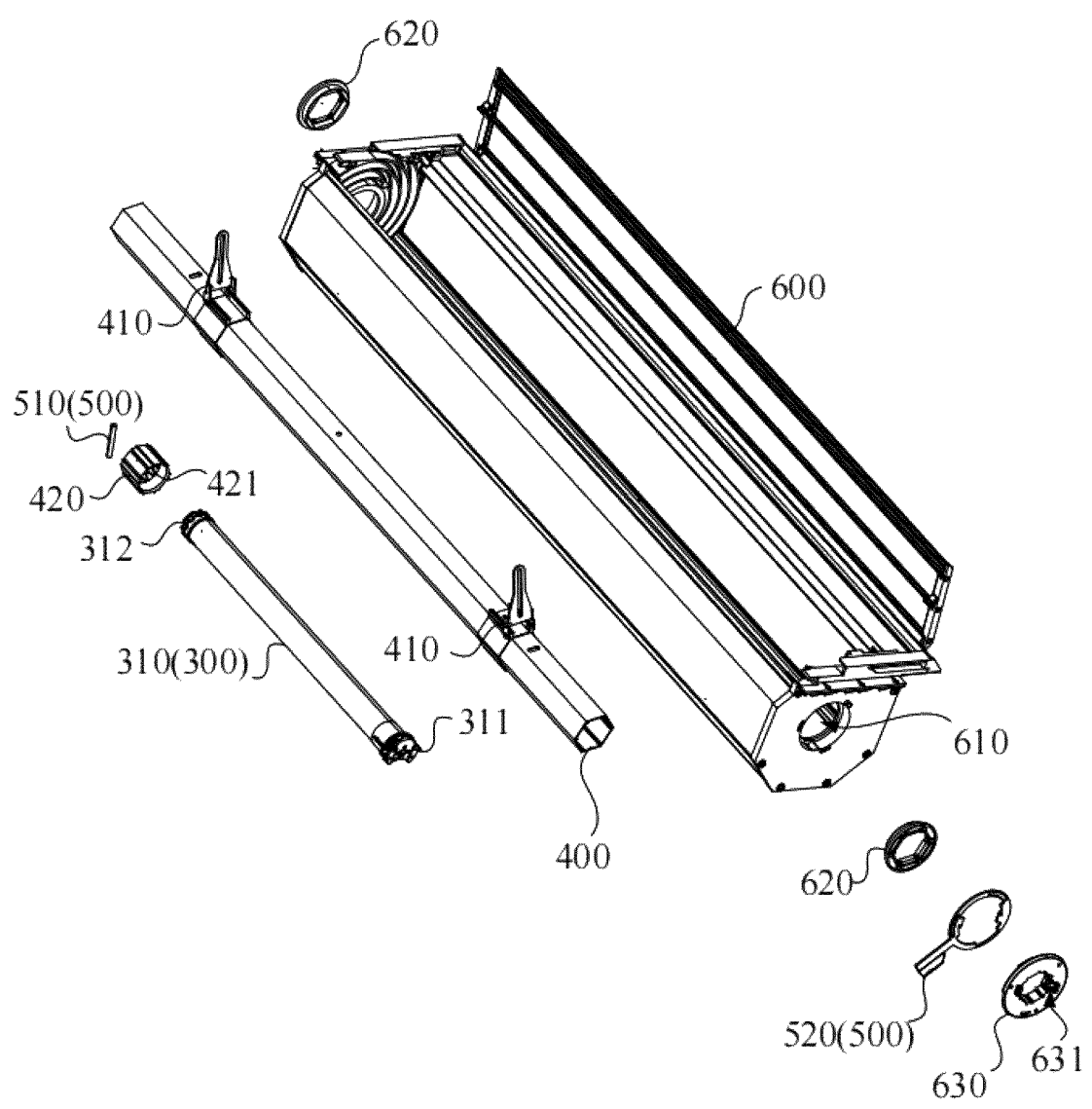
FIG. 5 is an exploded structural view of a driving device and a box in the roller shutter cover shown in FIG. 1.

Specifically, referring to FIG. 4 and FIG. 5 in combination, the roller shutter cover 10 further includes a roller shaft 400, where the driving device 300 is a motor 310, a rotating shaft of the motor 310 is connected to the roller shaft 400, and the roller shaft 400 is sleeved on an outer surface of the rotating shaft of the motor 310. In this way, the roller shaft 400 can play a role in transmission, and the roller shaft 400 can also support and protect the motor 310.

Further, FIG. 5 shows that the roller shutter cover 10 further includes a transmission bracket 410. FIG. 4 shows that a transmission shaft 120 is disposed on the roller shutter 100, and the transmission bracket 410 is connected to the transmission shaft 120. There are two transmission brackets 410 and two transmission shafts 120, the two transmission brackets 410 are located on two sides of the roller shaft 400 in an axial direction, and positions of the transmission shafts 120 are matched with positions of the transmission brackets 410. Certainly, the manufacturer can also adjust the number of transmission brackets 410 and transmission shafts 120 as needed, which is not limited in the present disclosure.

In this embodiment, the roller shutter cover 10 further includes a shaft coupling 420, where an inner wall of the shaft coupling 420 is sleeved on the rotating shaft of the motor 310, and an outer wall of the shaft coupling 420 is sleeved on an inner wall of the roller shaft 400. In this way, the frictional resistance between the rotating shaft of the motor 310 and the roller shaft 400 can be reduced. When the shaft coupling 420 is worn too much, the shaft coupling 420 can be directly replaced, thereby reducing repair costs.

Specifically, the inner wall of the shaft coupling 420 is provided with a first tooth portion 421, and the rotating shaft of the motor 310 is provided with a second tooth portion 312 matched with the first tooth portion 421. The transmission between the shaft coupling 420 and the rotating shaft of the motor 310 can be implemented by the cooperation of the first tooth portion 421 and the second tooth portion 312.

During use of the roller shutter cover 10, it is easily obstructed by external dirt, and the motor and a controller may malfunction. After the motor and the controller malfunction or after power supply of the complete vehicle is abnormal, the product will not be able to be opened or closed normally, losing its normal function.

In order to solve the above technical problems, the roller shutter cover 10 further includes a control assembly 500, where the control assembly 500 is connected to the shaft coupling 420, and the control assembly 500 can drive the shaft coupling 420 to be sleeved on the motor 310 or to separate from the motor 310. In this way, the control assembly 500 can switch an electric mode of the roller shutter cover 10. Exemplarily, in the electric mode, the motor 310 is connected to the roller shaft 400 by the shaft coupling 420, the roller shaft 400 is connected to the roller shutter 100, and the motor 310 rotates forward or backward to control opening or storage of the roller shutter 100. When the electric mode needs to be adjusted to a manual mode, the user only needs to operate the control assembly 500 to drive the shaft coupling 420 to separate from the rotating shaft of the motor 310, such that the user can move the roller shutter 100 by a hand to open or store the roller shutter 100.

Specifically, the control assembly 500 includes a limiting element 510 and a control element 520, where the control element 510 abuts against one side of the shaft coupling 420 to limit a stroke of the shaft coupling 420 in a length direction of the roller shaft 400. The control element 520 is connected to the motor 310, so as to drive the motor 310 to move in its axial direction.

In this embodiment, the control element 520 is a rotating ring 521, and a protruding structure for a hand to operate is disposed on the rotating ring 521. When the rotating ring 521 is rotated by the hand, due to the connection between the rotating ring 521 and the motor 310, the rotating ring 521 drives the motor 310 to rotate and the motor 310 moves along its axial direction, such that the meshing between the first tooth portion 421 and the second tooth portion 312 is cancelled, and the roller shutter cover 10 switches from the electric mode to the manual mode. Then, the rotating ring 521 is rotated in the opposite direction, and the motor 310 moves in the opposite direction along its axial direction, such that the roller shutter cover 10 switches from the manual mode to the electric mode.

It can be understood that an external force needs to be applied along a specific direction to rotate the rotating ring 521, thereby reducing the possibility of touch by mistake. Certainly, in other embodiments, the control assembly 500 can also be set to be of another existing switch structure. For example, a driving motor and a button which are connected to the shaft coupling 420 can be additionally disposed to control the shaft coupling so as to switch between the electric mode and the manual mode.

Further, the first tooth portion 421 and the second tooth portion 312 are both V-shaped teeth. Due to the need for the shaft coupling 420 to be sleeved on or to be out of contact with the motor 310, the V-shaped teeth can facilitate the alignment between the first tooth portion 421 and the second tooth portion 312, and the first tooth portion 421 can also separate from the second tooth portion 312 more smoothly.

The roller shutter cover 10 further includes a box 600, where the box 600 is configured to accommodate the motor 310 and the roller shutter 100, and two ends of the roller shaft 400 in an axial direction are mounted in mounting holes 610 on two sides of the box 600 in a length direction respectively. In this way, the roller shaft 400 can be more stable, which avoids the deformation caused by only fixing one side of the roller shaft 400; meanwhile, the roller shaft 400 supports the motor 310 more stably, which prevents the rotating shaft of the motor 310 from shaking during rotation.

Specifically, the roller shutter cover 10 further includes an adapter ring 620, where an inner wall of the adapter ring 620 is sleeved on an outer wall of the roller shaft 400, and an outer wall of the adapter ring 620 is sleeved on an inner wall of the mounting hole 610. In this way, the frictional resistance between the roller shaft 400 and the mounting hole 610 can be reduced. When worn too much, the adapter ring 620 can be directly replaced, thereby reducing repair costs.

Specifically, the motor 310 is a rod-type motor 310, a rotating shaft of the rod-type motor 310 passes through a cavity inside the roller shaft 400, one end of the rod-type motor 310 in an axial direction is mounted in the box 600, and the other end of the rod-type motor is connected by a shaft coupling 420. The rod-type motor 310 generally has a long rotating shaft. If only one side of the rod-type motor 310 is fixed to the box 600, the other end of the rod-type motor 310 away from the box 600 will deviate downwards due to gravity, such that significant shaking and noise will be caused when the rod-type motor 310 is in operation. The shaft coupling 420 is connected to the roller shaft 400, such that the roller shaft 400 can support and fix the rod-type motor 310, and the operation of the rod-type motor 310 is more stable.

The box 600 further includes a fixed cover 630, where the fixed cover 630 is connected to an outer surface of the box 600, so as to limit the motor 310 to the box 600. Specifically, one end of the motor 310 close to the fixed cover 630 is provided with a protruding portion 311, the fixed cover 630 is formed with a groove 631 matched with the protruding portion 311, and at least part of the protruding portion 311 is embedded into the groove 631, so as to limit the motor 310 to the box 600.

In this embodiment, there are two fixed covers 630, the two fixed covers 630 are disposed at two opposite ends of the box 600 in the length direction respectively, and the fixed covers 630 can fix an end part of the roller shaft 400 to the box 600 in addition to fixing the motor 310.

The box 600 further includes a threaded connecting piece for limiting the fixed cover 630 to a sidewall of the box 600. A threaded end of the threaded connecting piece penetrates through the fixed cover 630 and is in threaded connection with a threaded hole on the sidewall of the box 600. There are a plurality of threaded connecting pieces arranged at intervals along a circumferential direction of the fixed cover 630. It can be understood that in other embodiments, the box 600 can be provided with other fixing pieces to fix the fixed cover 630.

Figure 6:
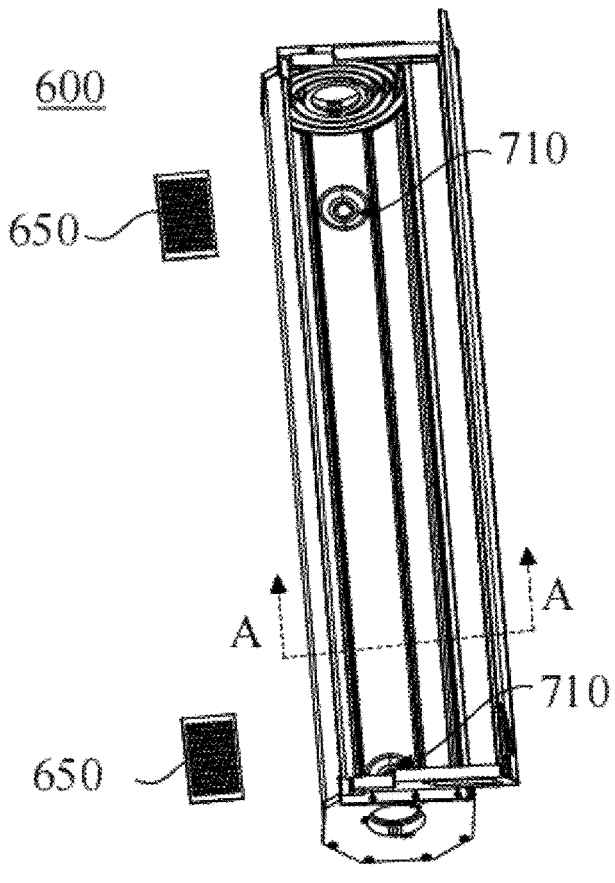
FIG. 6 is a schematic diagram of the overall structure of the box shown in FIG. 4.
Figure 7:
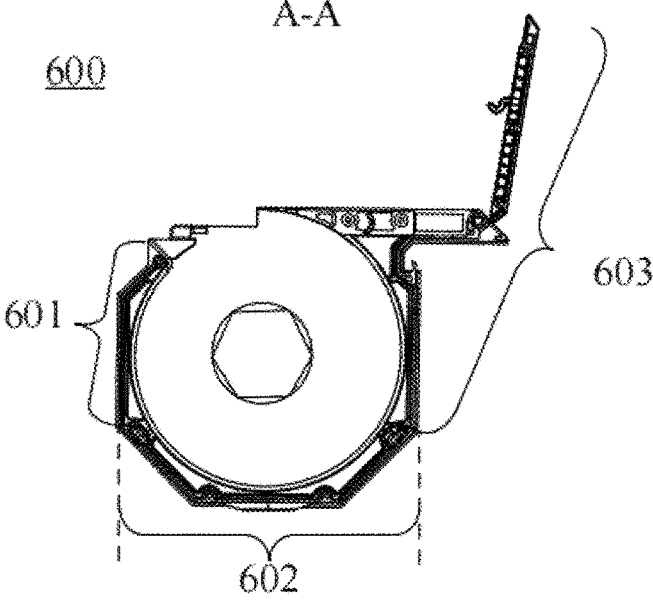
FIG. 7 is a cross-sectional view of the box shown in FIG. 6 taken along the section line A-A.

With reference to FIG. 6 and FIG. 7, specifically, the box 600 includes a first plate 601, a second plate 602, and a third plate 603 connected in sequence. The first plate 601, the second plate 602, and the third plate 603 enclose to form a storage cavity for storing the roller shutter 100, where any adjacent two of the first plate 601, the second plate 602, and the third plate 603 are detachably connected.

It should be noted that in other embodiments, the box 600 may further include a fourth plate, a fifth plate, a sixth plate, etc., which is not limited in the present application. All technical solutions that include three sequentially detachably connected plates shall fall within the protection scope of the present application.

Since the first plate 601, the second plate 602, and the third plate 603 are detachably connected to each other, there will be gaps at the joints between the plates and the storage position of the roller shutter 100. Rainwater and sewage may enter the storage cavity inside the box 600 through these gaps, and the accumulated rainwater and sewage will produce an odor and corrode the box 600.

To solve the above issue, specifically, a drainage hole 710 is provided on the bottom wall of the box 600, and the drainage hole 710 is in communication with the environment. In this way, the rainwater or sewage inside the box 600 can be discharged out of the box 600 in a timely manner. Further, the box 600 is further provided with filter covers 650, which are used to cover the drainage hole 710. Each of the filter covers 650 is provided with a plurality of water leakage channels for spaced drainage, so that rainwater or sewage can be discharged out of the box 600 through the drainage hole 710, while debris such as leaves and gravel is blocked to prevent the debris from clogging the drainage hole 710. The user can clean the debris on the filter covers 650 regularly.

Further, in the present embodiment, the number of the drainage holes 710 and the filter covers 650 is two each. The two drainage holes 710 are respectively provided on opposite sides of the box 600, and the positions of the filter covers 650 match the positions of the drainage holes 710. In this way, the accumulation of rainwater or sewage on one side of the box 600 due to reasons such as the inclination of the box 600 can be avoided as much as possible. Of course, the manufacturer can also adjust the number of the drainage holes 710 and the filter covers 650 as needed.

In addition, after the box 600 is completely assembled, the third plate 603 can be opened to clean the garbage inside the box 600 or maintain the structural components inside the box 600. For example, the third plate 603 can be designed with a freely openable and closable structure.

Figure 8:
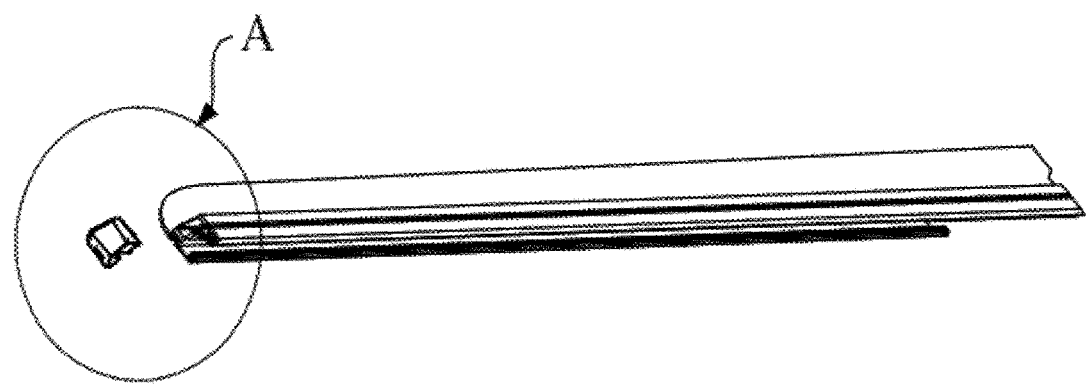
FIG. 8 is a schematic structural diagram of a track of the roller shutter cover shown in FIG. 1.
Figure 9:
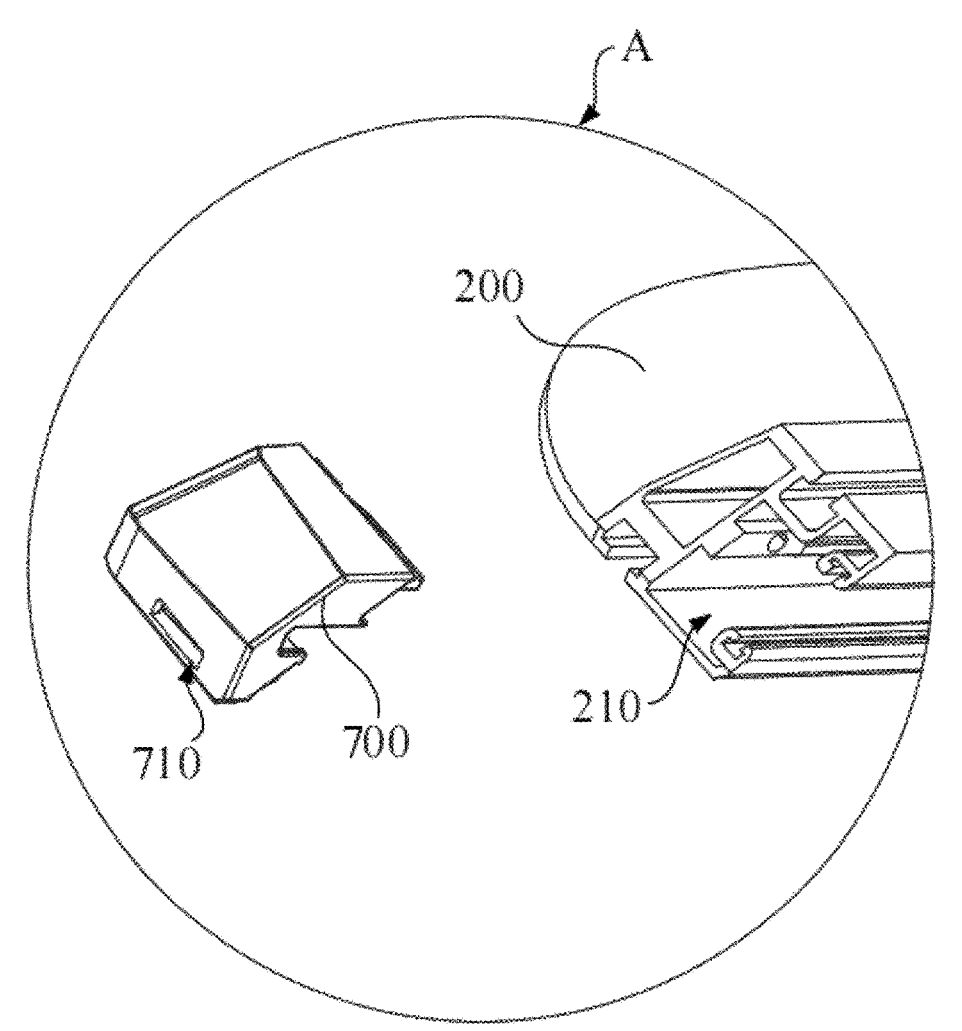
FIG. 9 is a partial enlarged view of an area A shown in FIG. 8.

Referring to FIG. 3, FIG. 8, and FIG. 9 in combination, the roller shutter cover 10 further includes a drainage apparatus 700, where the drainage apparatus 700 is disposed at a front end of the slide rail 200. It can be understood that due to the connection between the roller shutter 100 and the slide rail 200, rainwater or sewage falling on the roller shutter 100 is collected on the slide rail 200 along the shutter slats 110 on the roller shutter 100. The drainage apparatus 700 communicates with the slide rail 200, such that the rainwater or sewage can be drained away, thereby preventing the rainwater or sewage from wetting the goods in the truck bed.

In this embodiment, there are two slide rails 200 and two drainage apparatuses 700, where the two slide rails 200 are disposed on two opposite sides of the roller shutter 100 respectively to make the roller shutter 100 move more smoothly, and positions of the drainage apparatuses 700 are matched with positions of the slide rails 200.

Specifically, a water collection tank 210 is disposed on the slide rail 200, the drainage apparatus 700 is formed with a drainage hole, and the drainage hole communicates with the water collection tank 210. The water collection tank 210 can collect water left on the slide rail 200 and then discharge the water out of the roller shutter cover 10 through the drainage hole. A length extension direction of the water collection tank 210 is parallel to a length extension direction of the slide rail 200. In addition, the water collection tank 210 extends from the front end of the slide rail 200 in the length direction to the other end, so as to improve the water collection efficiency.

Further, the drainage apparatus 700 is detachably connected to the slide rail 200, so as to facilitate the cleaning of sundries accumulated in the drainage hole and a drainage tank. In addition, the drainage apparatus 700 is disposed at the front end of the slide rail 200, such that the drainage apparatus 700 is prone to collision. As the drainage apparatus 700 is detachably mounted on the slide rail 200, the drainage apparatus 700 can be directly replaced when damaged, thereby reducing repair costs. The specific detachable connection of the drainage apparatus may be a threaded connection, a snap-fit connection, or the like, which is not limited in the present disclosure.

Figure 10:
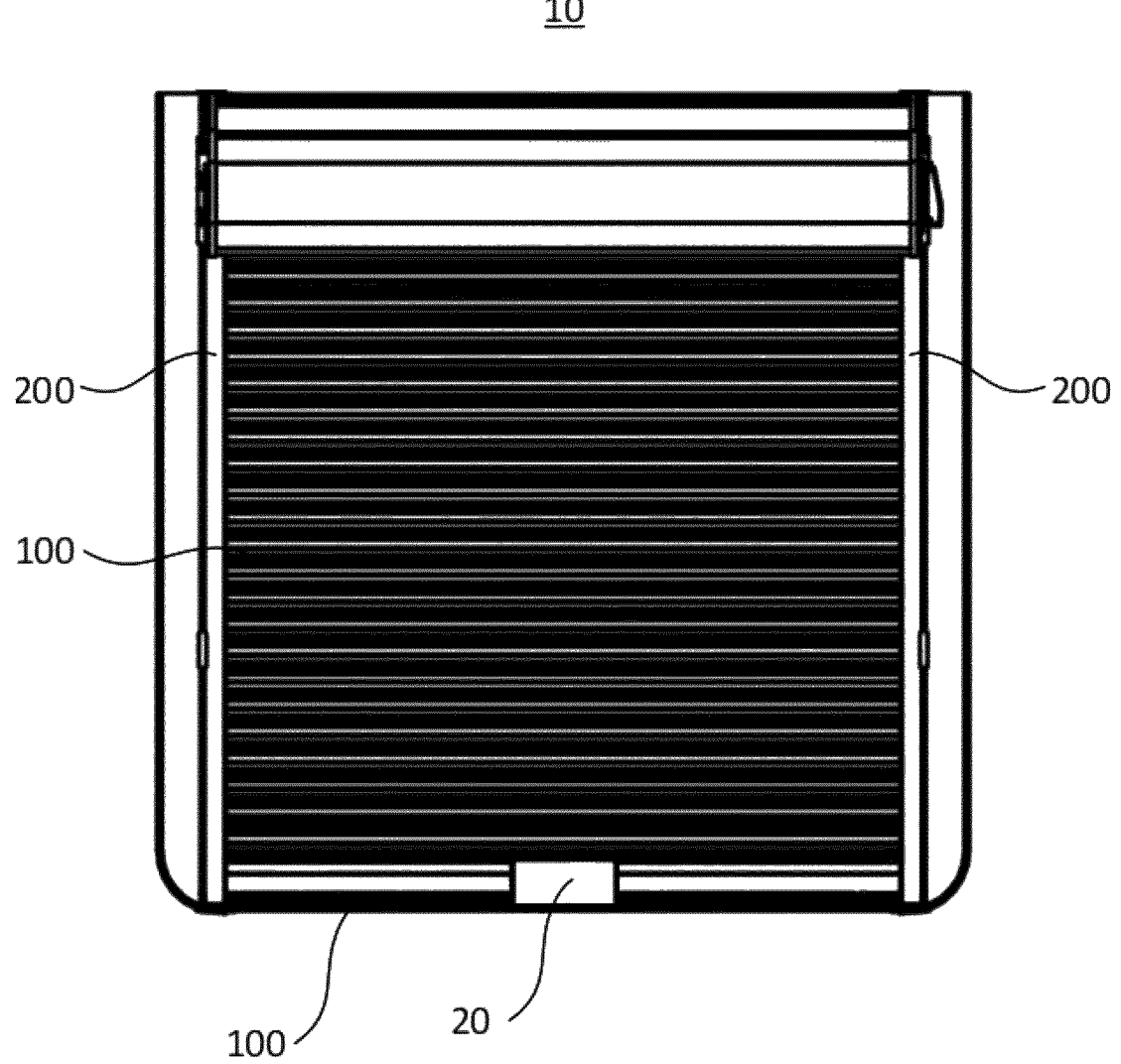
FIG. 10 is another schematic structural diagram of the roller shutter cover provided in an embodiment of the present application.

As shown in FIG. 10, in some embodiments, in addition to the aforementioned slide rail 200 and roller shutter 100, the roller shutter cover 10 provided in the present application may further include a manual driving structure 20, disposed at one end of the roller shutter 100, for example, the front end of the roller shutter 100. Optionally, the manual driving structure 20 is capable of driving the roller shutter 100 to move on the slide rail 200 so that the roller shutter 100 switches between an opened state and a storage state.

In some embodiments, the aforementioned manual driving structure 20 refers to a non-automatic driving structure, which may include a mechanical structure and/or an electrical structure, etc.

Figure 11:
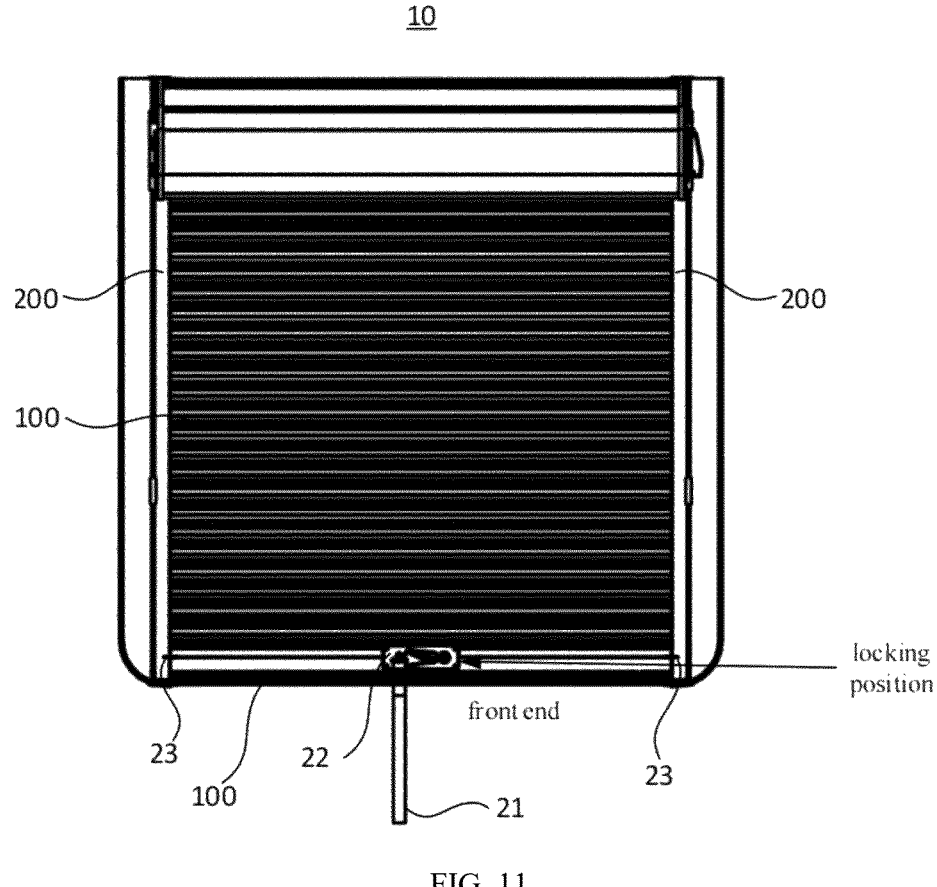
FIG. 11 is yet another schematic structural diagram of the roller shutter cover provided in an embodiment of the present application.

As shown in FIG. 11, in some embodiments, the manual driving structure 20 may include a traction member 21, disposed at the front end of the roller shutter 100, and configured to drive the roller shutter 100 to move on the slide rail 200 in response to an external force so that the roller shutter 100 switches between the opened state and the storage state.

In some embodiments, the manual driving structure 20 may further include a locking structure 22, disposed at the front end of the roller shutter 100, and configured to lock the roller shutter 100 when the roller shutter 100 is completely in the opened state, so that the roller shutter 100 cannot move relative to the slide rail 200.

In some embodiments, the locking structure 22 may also lock the roller shutter 100 when the roller shutter 100 is not completely in the opened state, for example, locking the roller shutter 100 when the roller shutter 100 is opened by 20%, 30%, 40%, 50%, 60%, 70%, 80%, 90% or other proportions. In practical applications, the locking structure 22 may lock the roller shutter 100 when the roller shutter 100 is opened by any proportion or when the roller shutter 100 is completely in the opened state, based on actual conditions such as user requirements.

As shown in FIG. 11, in some embodiments, the traction member 21 may be connected with the locking structure 22 and configured to pull and activate the locking structure 22 in response to the external force; and the locking structure 22 is configured to be located at a locking position when the roller shutter 100 is completely in the opened state and lock the roller shutter 100 at the locking position.

In some embodiments, the traction member 21 may be disposed separately from the locking structure 22 and configured to pull the roller shutter 100 in response to the external force; and the locking structure 22 is configured to be located at the locking position when the roller shutter 100 is completely in the opened state and be in an activated state at the locking position to lock the roller shutter 100.

In some embodiments, the locking structure 22 may also be located at the locking position when the roller shutter 100 is not completely in the opened state and lock the roller shutter 100 at the locking position, for example, being located at the locking position and locking the roller shutter 100 when the roller shutter 100 is opened by 20%, 30%, 40%, 50%, 60%, 70%, 80%, 90% or other proportions. In practical applications, the locking structure 22 may be located at the locking position when the roller shutter 100 is opened by any proportion or when the roller shutter 100 is completely in the opened state, and lock the roller shutter 100 at the locking position, based on actual conditions such as user requirements.

The locking position shown in FIG. 11 is merely an example. The locking position where the locking structure is located when the roller shutter 100 is opened by 20%, 30%, 40%, 50%, 60%, 70%, 80%, 90% or other proportions corresponds to the position of the locking structure when the roller shutter 100 is opened by the aforementioned proportions.

In some embodiments, regardless of whether the traction member 21 is connected with the locking structure 22, the locking structure 22 may be activated based on the pulling of the traction member 21 or its own movement process, and lock the roller shutter 100 at the locking position based on the pulling of the traction member 21 or its own movement process.

In some embodiments, the aforementioned external force may come from a user, or a mechanical structure and/or an electrical structure used by the user, etc.

In some embodiments, the traction member 21 may be a mechanical structure and/or an electrical structure used by the user. Optionally, the traction member 21 may be a rope, a belt, etc.

In some embodiments, the locking structure 22 may include a mechanical structure and/or an electrical structure. Optionally, the locking structure 22 may be a lock. Optionally, when the locking structure 22 is a lock, the lock may include a pin 23 capable of locking the roller shutter 100. For example: when the traction member 21 is connected with the locking structure 22 (taking a lock as an example below), the traction member 21 drives the lock to be activated based on the external force when opening the roller shutter 100; when reaching the locking position, the external force on the traction member 21 is released, so that the pin 23 on the lock pops out and abuts against the slide rail 200, so that the roller shutter 100 is locked and cannot continue moving relative to the slide rail 200. Optionally, the pin 23 may also abut against other components, as long as the roller shutter 100 can be locked and cannot continue moving relative to the slide rail 200.

Figure 12:
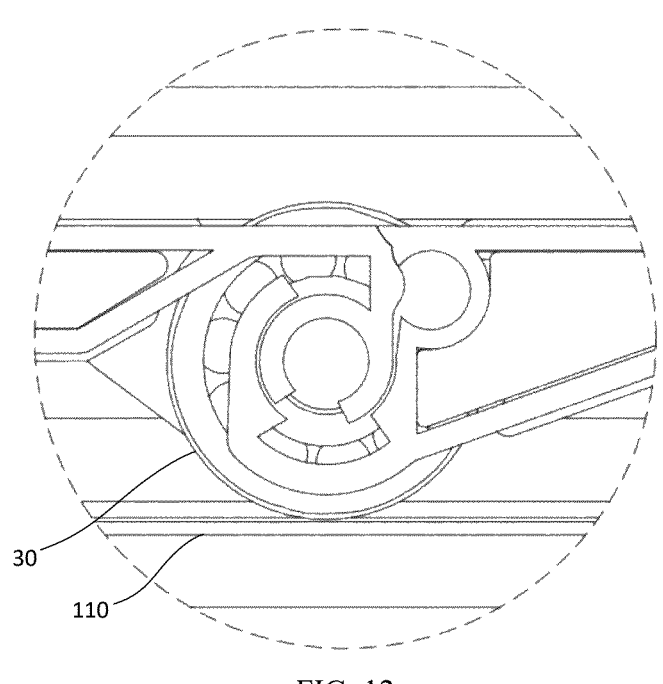
FIG. 12 is a schematic structural diagram of the shutter slat provided in an embodiment of the present application.

As shown in FIG. 12, in some embodiments, to make the roller shutter 100 move more smoothly on the slide rail 200, at least one movement auxiliary member 30 may be disposed on each side of at least one shutter slat 110. Optionally, the movement auxiliary member 30 is configured to support the shutter slat 110 to move on the slide rail 200 in a manner of reducing the frictional force between the roller shutter 100 and the slide rail 200.

In some embodiments, the movement auxiliary member 30 may be a bearing. Optionally, the movement auxiliary member 30 may be a slider, a sliding piece, or other components, for example: the movement auxiliary member 30 may be an elastic sliding piece.

In some embodiments, for one shutter slat 110, one, two or more movement auxiliary members 30 may be disposed on each side of the shutter slat 110. Optionally, the number of movement auxiliary members 30 on both sides of one shutter slat 110 may be the same or different.

Figure 13:
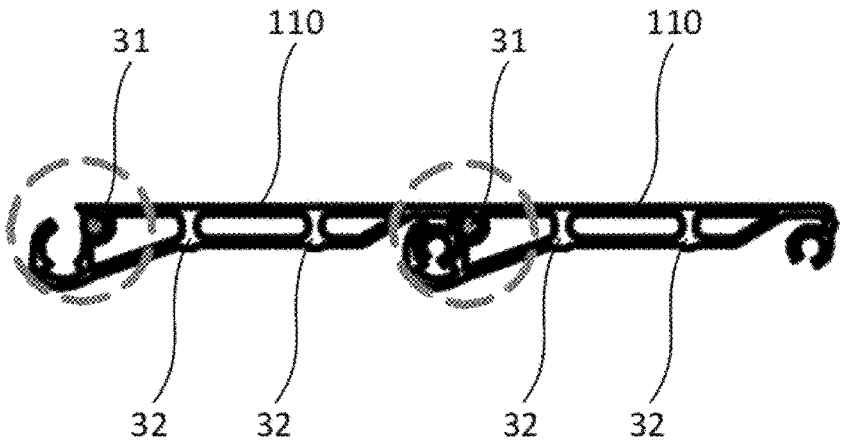
FIG. 13 is another schematic structural diagram of the shutter slat provided in an embodiment of the present application.

As shown in FIG. 13, in some embodiments, a sealing member 31 may be disposed between two adjacent shutter slats 110.

In some embodiments, the sealing member 31 may be a high-elasticity, anti-aging, high-temperature-resistant and low-temperature-resistant sealing strip, which is used to prevent external substances such as water and dust from entering the roller shutter cover 10 and improve the sealing performance of the roller shutter cover 10.

In practical application, when the shutter slat 110 is in contact with the sealing member 31, the shutter slat 110 may squeeze the sealing member 31, so that the sealing member 31 achieves a sealing effect.

As shown in FIG. 13, in some embodiments, a reinforcing rib 32 may be disposed in at least one of the shutter slats 110.

In some embodiments, the shutter slat 110 may have a hollow structure. Optionally, a reinforcing rib 32 may be disposed in the hollow structure to improve the strength of the shutter slat 110. Optionally, the number of reinforcing ribs 32 in each shutter slat 110 may be one, two or more. In addition, the material of the shutter slat 110 may be high-quality and high-strength thickened aluminum alloy.

Figure 14:
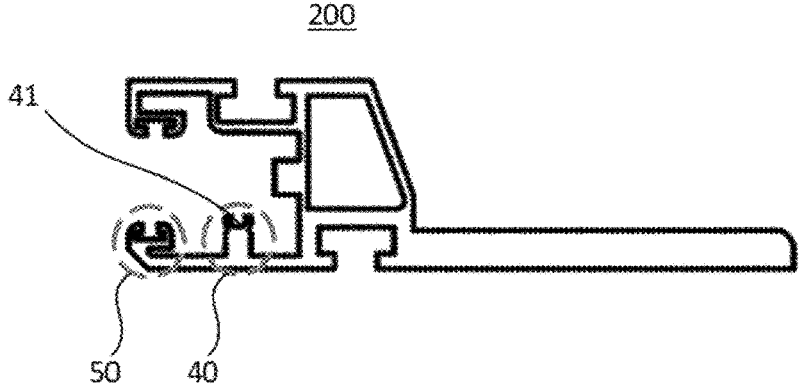
FIG. 14 is a schematic structural diagram of the slide rail provided in an embodiment of the present application.

As shown in FIG. 14, in some embodiments, the slide rail 200 may be provided with a main slideway 40 including an arc surface 41, and the main slideway 40 is configured to allow the roller shutter 100 to move on the arc surface 41 of the main slideway 40 in a point-contact manner.

In some embodiments, the movement auxiliary member 30 may move on the arc surface 41 of the main slideway 40. The aforementioned point-contact movement manner can enable the roller shutter 100 to move more smoothly on the slide rail 200. Optionally, the slide rail 200 may be made of a high-strength and good-toughness thickened aluminum alloy material, and the main slideway 40 may be of a high-hardness material and undergo chrome plating treatment.

As shown in FIG. 14, in some embodiments, the slide rail 200 may further be provided with a protective slideway 50. Optionally, the roller shutter 100 will not be in contact with the protective slideway 50 during normal use.

In some embodiments, the protective slideway 50 may block the roller shutter 100 when an abnormality occurs in the movement of the roller shutter 100, so as to prevent the roller shutter 100 from falling off the slide rail 200. Optionally, the protective slideway 50 may further serve as a backup slideway for the roller shutter 100, for example: when the main slideway 40 is unavailable due to a failure of the main slideway 40 or abnormal movement of the roller shutter 100, the roller shutter 100 may be disposed on the protective slideway 50, so that the roller shutter 100 can move on the protective slideway 50 to switch between the opened state and the storage state. Optionally, the protective slideway 50 may have the same material and shape as the main slideway 40 (such as the aforementioned arc surface 41) to ensure that the roller shutter 100 can move smoothly on the protective slideway 50.

As shown in FIG. 14, in some embodiments, the main slideway 40 may be located on the inner side of the slide rail 200, and the protective slideway 50 may be located on the outer side of the slide rail 200.

Figure 15:
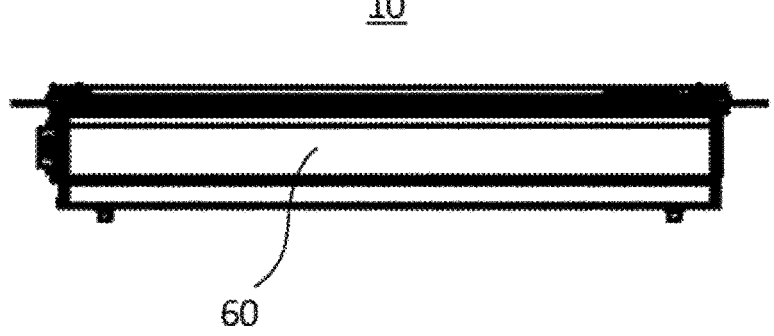
FIG. 15 is a schematic diagram of the arrangement of the light-emitting member provided in an embodiment of the present application.

As shown in FIG. 15, in some embodiments, the roller shutter cover 10 provided by embodiments of the present application may further include a light-emitting member 60.

In some embodiments, the light-emitting member 60 may be disposed on the front side of the roller shutter cover 10; and/or the front lower side of the roller shutter cover 10; and/or at least one of the left side and right side of the roller shutter cover 10. Optionally, the light-emitting member 60 may be disposed on the surface of the roller shutter cover 10 at the aforementioned positions. In addition to the aforementioned positions, the light-emitting member 60 may also be disposed at other positions according to actual needs, as long as lighting can be achieved.

Figure 16:
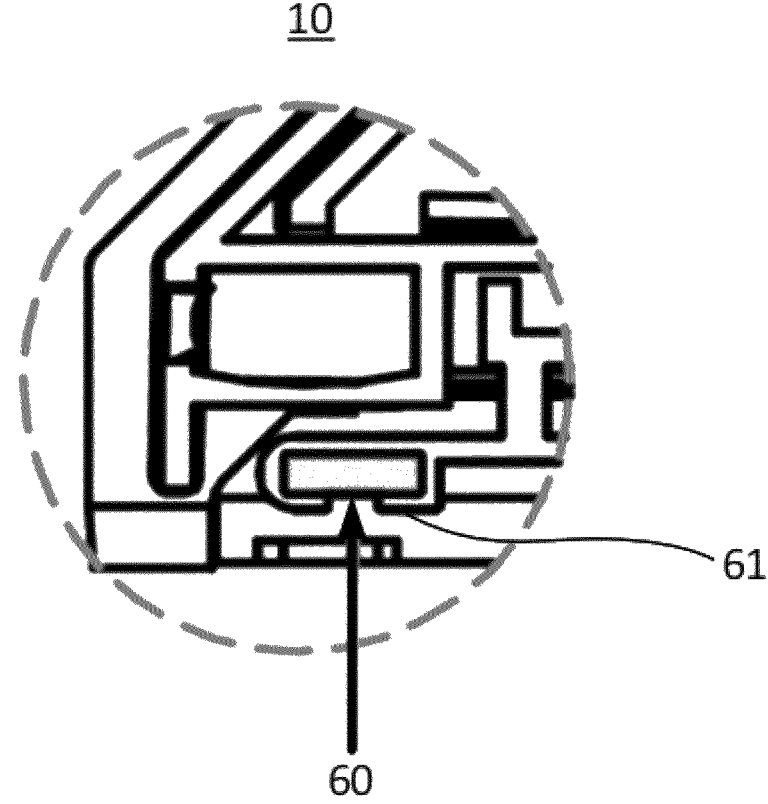
FIG. 16 is another schematic diagram of the arrangement of the light-emitting member provided in an embodiment of the present application.

As shown in FIG. 16, in some embodiments, the light-emitting member 60 may be disposed in the clamping groove structure 61 of the roller shutter cover 10. In this way, the light-emitting member 60 is easy to install, not easy to fall off, and not easy to be worn.

In some embodiments, the number of light-emitting members 60 may be one, two, or more.

In some embodiments, the light-emitting member 60 may be an LED light strip, for example: a high-brightness LED light strip or other light sources. Optionally, the light emitted by the light-emitting member 60 may be visible light such as white light, yellow light, red light or colored light, or invisible light such as infrared rays and ultraviolet rays.

As shown in FIG. 2, in some embodiments, the tail portion of the box 600 may have a protruding portion 70. In this way, the protruding portion 70 can match the truck bed of the pickup truck, improving the sealing performance of the roller shutter cover 10.

Figure 17:
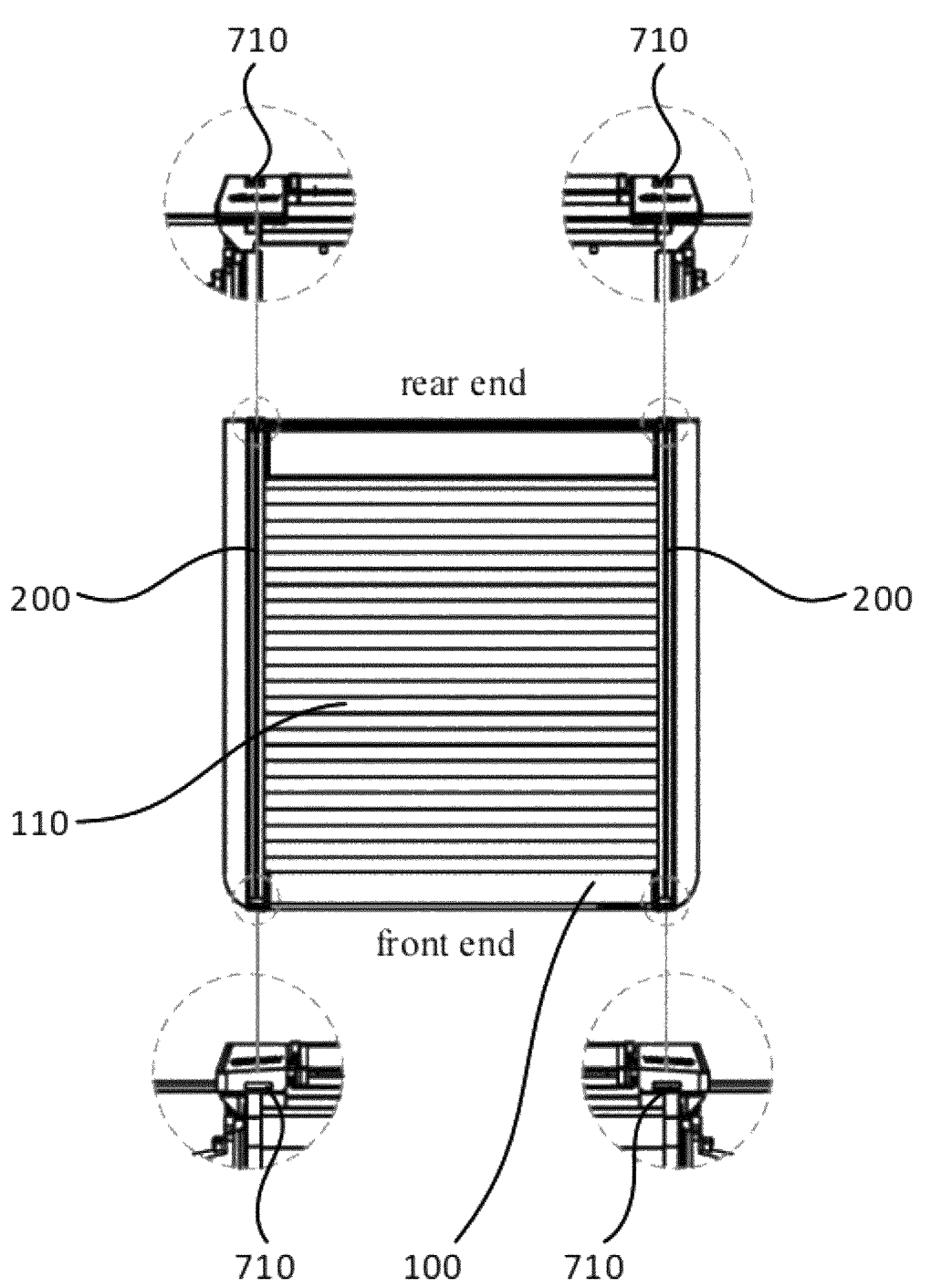
FIG. 17 is a schematic diagram of the drainage hole provided in an embodiment of the present application.

As shown in FIG. 17, in some embodiments, the roller shutter cover 10 provided by embodiments of the present application may further include drainage holes 710.

In some embodiments, the drainage holes 710 may be disposed at the front end and/or the rear end of the slide rail 200. Optionally, as shown in FIG. 6, the drainage holes 710 may also be disposed at the bottom of the box 600 or other positions of the roller shutter cover 10, as long as effective drainage can be achieved.

The specific embodiments described herein are merely illustrative of the spirit of the present disclosure. Those skilled in the art to which the present disclosure belongs may make various modifications or supplements to the specific embodiments described, or adopt similar methods to replace them, without departing from the scope defined by the spirit of the present disclosure.

What is claimed is:

1. A roller shutter cover, comprising:
a slide rail;
a roller shutter, connected to the slide rail and capable of moving on the slide rail, wherein the roller shutter comprises a plurality of sequentially connected shutter slats; and
a manual driving structure, disposed at one end of the roller shutter and capable of driving the roller shutter to move on the slide rail so that the roller shutter switches between an opened state and a storage state;
wherein the slide rail is provided with a main slideway including a concave arc surface, wherein the main slideway is configured to carry the roller shutter to move on the concave arc surface of the main slideway in a point-contact manner;
wherein the slide rail is further provided with a protective slideway including a concave structure, which is configured to carry the roller shutter to move within the concave structure of the protective slideway when serving as a backup slideway; wherein the main slideway is located on an inner side of the slide rail, and the protective slideway is adjacent to the main slideway and located on an outer side of the slide rail.

2. The roller shutter cover according to claim 1, wherein at least one movement auxiliary member is disposed on each side of at least one of the shutter slats;
wherein the movement auxiliary member is configured to support the shutter slat to move on the slide rail in a manner of reducing a frictional force between the roller shutter and the slide rail.

3. The roller shutter cover according to claim 1, wherein a sealing member is disposed between two adjacent shutter slats among the shutter slats.

4. The roller shutter cover according to claim 1, wherein a reinforcing rib is disposed in at least one of the shutter slats.

5. The roller shutter cover according to claim 1, wherein the manual driving structure comprises a traction member, disposed at a front end of the roller shutter, and configured to drive the roller shutter to move on the slide rail in response to an external force so that the roller shutter switches between the opened state and the storage state.

6. The roller shutter cover according to claim 5, wherein the manual driving structure further comprises a locking structure, disposed at the front end of the roller shutter, and configured to lock the roller shutter when the roller shutter is completely in the opened state, so that the roller shutter cannot move relative to the slide rail.

7. The roller shutter cover according to claim 6, wherein
the traction member is connected with the locking structure and is configured to pull and activate the locking structure in response to the external force; and the locking structure is configured to be located at a locking position when the roller shutter is completely in the opened state, and to lock the roller shutter at the locking position; or
the traction member is disposed separately from the locking structure and is configured to pull the roller shutter in response to the external force; and the locking structure is configured to be located at the locking position when the roller shutter is completely in the opened state, and to be in an activated state at the locking position to lock the roller shutter.

8. The roller shutter cover according to claim 1, further comprising a light-emitting member.

9. The roller shutter cover according to claim 8, wherein
the light-emitting member is disposed on a front side of the roller shutter cover; and/or
the light-emitting member is disposed on a front lower side of the roller shutter cover; and/or
the light-emitting member is disposed on at least one of left side and right side of the roller shutter cover.

10. The roller shutter cover according to claim 8, wherein the light-emitting member is disposed in a clamping groove structure of the roller shutter cover.

11. The roller shutter cover according to claim 1, further comprising a box, configured to accommodate the roller shutter.

12. The roller shutter cover according to claim 11, wherein the box comprises a first plate, a second plate, and a third plate connected in sequence, wherein the first plate, the second plate, and the third plate enclose to form a storage cavity for storing the roller shutter, and any adjacent two of the first plate, the second plate, and the third plate are detachably connected.

13. The roller shutter cover according to claim 11, wherein a bottom wall of the box is provided with a drainage hole and a filter cover, wherein the drainage hole is in communication with environment, and the filter cover is configured to cover the drainage hole.

14. The roller shutter cover according to claim 11, wherein a tail portion of the box is provided with a protruding portion.

15. The roller shutter cover according to claim 11, further comprising drainage holes; wherein the drainage holes are disposed at a front end and/or a rear end of the slide rail; and/or the drainage holes are disposed at a bottom of the box.

16. The roller shutter cover according to claim 1, further comprising a drainage apparatus, mounted at a front end of the slide rail; wherein a water collection tank is disposed on the slide rail, the drainage apparatus is formed with a drainage hole, and the drainage hole communicates with the water collection tank.

17. The roller shutter cover according to claim 16, wherein the drainage apparatus is detachably connected to the slide rail.

\* \* \* \* \*